United States Patent [19]

Musschoot

[11] Patent Number: 4,858,749

[45] Date of Patent: Aug. 22, 1989

[54] MASS FLOW SPIRAL WITH ABSORBER DRIVE

[75] Inventor: Albert Musschoot, Barrington, Ill.

[73] Assignee: General Kinematics Corporation, Barrington, Ill.

[21] Appl. No.: 152,047

[22] Filed: Feb. 4, 1988

[51] Int. Cl.$^4$ ............................................. B65G 27/02
[52] U.S. Cl. .................................................... 198/756
[58] Field of Search ................... 198/756, 757, 550.01, 198/770

[56] References Cited

U.S. PATENT DOCUMENTS

| | | | |
|---|---|---|---|
| 2,760,504 | 8/1956 | Spurlin | 134/132 |
| 2,771,983 | 11/1956 | Carrier, Jr. | 198/756 |
| 2,805,841 | 9/1957 | Kyle | 165/92 |
| 2,827,157 | 3/1958 | Tsuchiya et al. | 198/757 |
| 2,847,767 | 8/1958 | Carrier, Jr. | 34/164 |
| 2,922,514 | 1/1960 | Carrier, Jr. | 198/756 |
| 2,927,683 | 3/1960 | Carrier, Jr. | 198/756 |
| 2,934,202 | 4/1960 | Roder et al. | 198/756 |
| 2,946,429 | 7/1960 | Carrier, Jr. | 198/756 |
| 3,053,380 | 9/1962 | Spurlin | 198/756 |
| 3,407,670 | 10/1968 | Venanzetti | 74/61 |
| 3,789,977 | 2/1974 | Musschoot | 198/756 |
| 4,267,919 | 5/1981 | Schrader | 198/756 |

FOREIGN PATENT DOCUMENTS

| | | | |
|---|---|---|---|
| 828219 | 2/1960 | United Kingdom | 78/1 |
| 857250 | 12/1960 | United Kingdom | 78/1 |

*Primary Examiner*—Joseph E. Valenza
*Attorney, Agent, or Firm*—Wood, Dalton, Phillips, Mason & Rowe

[57] ABSTRACT

A vibratory material conveying apparatus has a tower with a spiral flight to be vibrated for conveying material vertically, a platform through which the tower extends, structure for resiliently supporting the platform above a support surface for the apparatus, structure for resiliently attaching the spiral flight to the platform, and structure for imparting vibration to the platform. The invention comprehends a two mass system with the platform and vibration imparting structure, a force member mass and a work member mass. The system permits large amplitude vibrations to be imparted to the work member with minimal dynamic reaction to the support surface from the force member vibration.

16 Claims, 1 Drawing Sheet

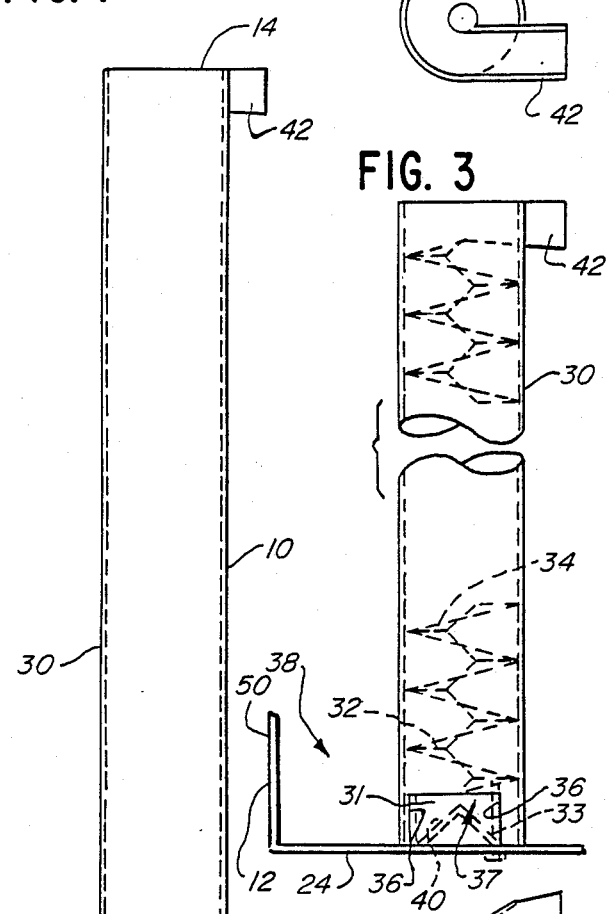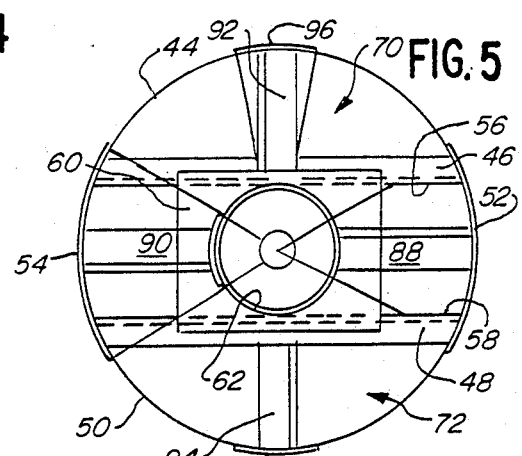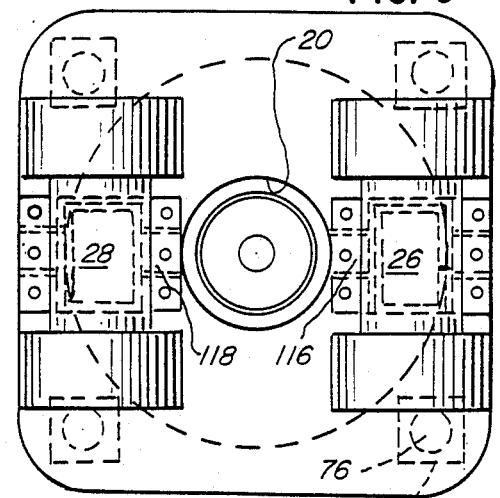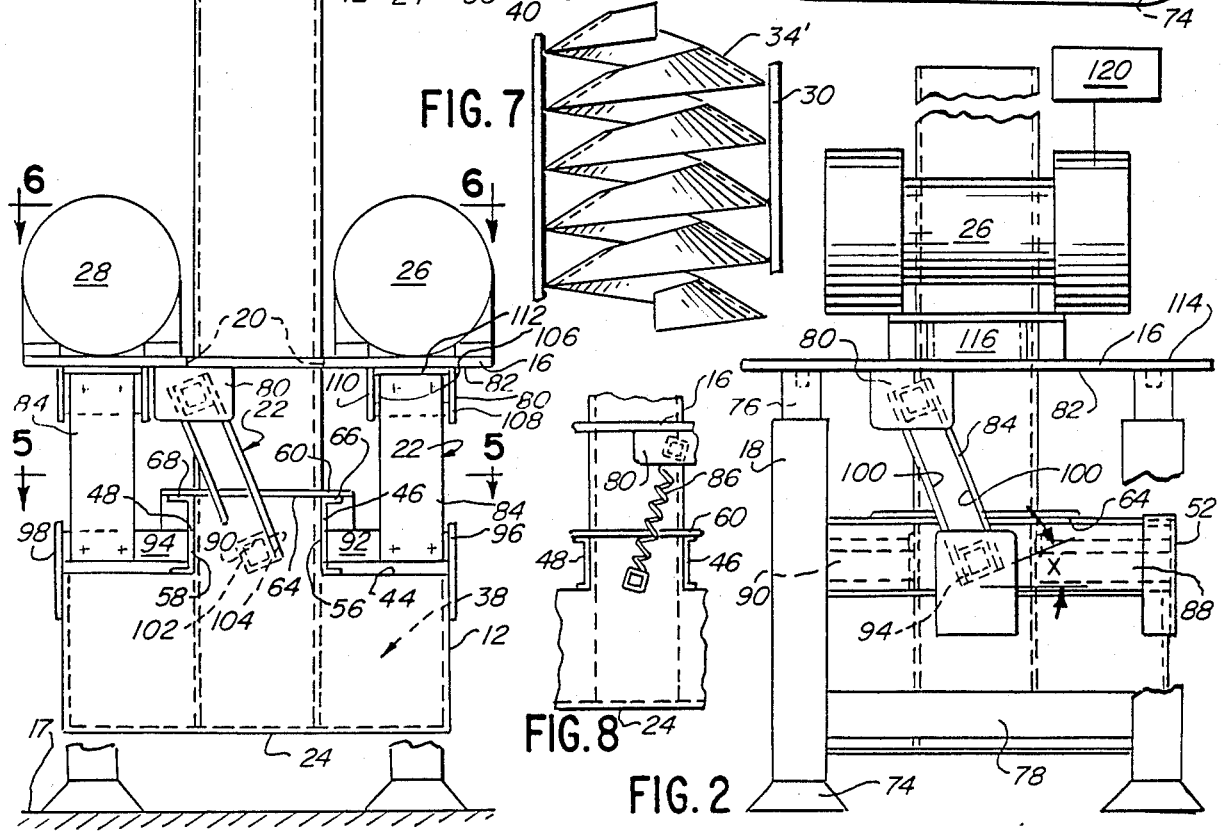

MASS FLOW SPIRAL WITH ABSORBER DRIVE

BACKGROUND OF THE INVENTION

1. Field of the Invention

This invention relates to vibratory conveyors and, more particularly, to a conveyor with a spiral ramp for the vertical conveyance of materials.

2. Background Art

Vibratory conveyors utilizing a spiral ramp surface to elevate material are well known. Most commonly, a vibration generating structure is directly attached to a helical flight defining the ramp surface and imparts vibration thereto through brute force. Such a system is shown in U.S. Pat. No. 2,927,683, to Carrier. This and other like systems have several drawbacks.

First, the dynamic forces applied to the bearing surface for the apparatus are substantial, thereby generally precluding above grade installations.

An additional problem with the above-described prior art structures is that large motors are required to handle system start-up and shut-down. Even with large motors, premature wear on and/or failure of the motors and associated structure may result. This latter problem is aggravated in systems wherein the motors employ a fixed eccentric weight to develop vibratory forces upon rotation of the motor shaft.

SUMMARY OF THE INVENTION

The present invention is specifically directed to overcoming the above enumerated problems in a novel and simple manner.

A vibratory material conveying apparatus according to the present invention has a spiral flight to be vibrated for conveying material vertically, a platform, structure for resiliently supporting the platform above a support surface for the apparatus, structure for resiliently attaching the spiral flight to the platform, and structure for imparting vibration to the platform.

The invention comprehends a two mass system with the platform and vibration imparting structure, a force member mass and the spiral flight a work member mass. The system permits large amplitude vibrations to be imparted to the work member with minimal dynamic reaction to the support surface from the force member vibration.

In a preferred form, the platform has an opening and the spiral conveying structure extends through the opening and is resiliently supported by structure beneath the platform. An overall compact design results. The resilient supporting structure may be leaf springs, coil springs, or other, suitable, similarly acting structure.

Another aspect of the invention is the enclosure of the spiral conveying structure. While the invention is operable with any type of spiral conveying structure, as with a spiral flight wrapped externally on a central core, the enclosed design is preferred in many applications primarily because it eliminates dusting of powdered materials that are conveyed and insulates the conveying material from the ambient air to thereby prevent heat loss from hot products and temperature rise with cold products.

A further aspect of the invention is the provision of structure to readily vary conveying rate. In a preferred form, the vibration imparting structure consists of first and second motors with parallel, horizontally situated rotary shafts. At least one eccentric weight is provided on each shaft and is adjustable to vary the amplitude of vibrations and thereby the conveying rate as operations dictate. At the same time, this adjusting capability can be utilized to minimize transient motion during start-up and shutdown.

Additionally, the separate shafts are non-mechanically connected and will be subject to the inertial synchronization phenomenon to obtain proper synchronization of the drive shafts and associated eccentric weights. Because low or no load start-up of the system and gradual eccentric loading and unloading can be provided, smaller motors can be utilized, thereby making the system economical in terms of the initial costs and extended equipment life.

BRIEF DESCRIPTION OF THE DRAWINGS

FIG. 1 is a front elevation view of a vibratory material conveying apparatus according to the present invention;

FIG. 2 is a side elevation view of the vibratory apparatus in FIG. 1;

FIG. 3 is an elevation view of a tower with a spiral conveying structure therein on the apparatus in FIGS. 1 and 2;

FIG. 4 is a plan view of the outlet on the tower in FIG. 3;

FIG. 5 is a section view of the apparatus taken along line 5—5 of FIG. 1;

FIG. 6 is a section view of the apparatus taken along line 6—6 of FIG. 1;

FIG. 7 is a broken away section view of a tower with a modified ramp configuration; and FIG. 8 is a partial broken away view of a modified form of spring connection between the platform and the tower.

DETAILED DESCRIPTION OF THE DRAWINGS

The vibratory conveying structure according to the present invention consists of a vertically extending tower 10 having a rigidly attached hopper 12 at its lower end for the introduction of material to be conveyed and an outlet 14 at the top of the tower 10 for continuously discharging the conveyed material. The apparatus further has a platform 16 supported resiliently from a floor surface 17 by legs 18 (FIG. 2). The platform 16 has an opening 20 through which the tower 10 extends so that a portion of the tower 10 and the associated hopper 12 reside beneath the platform 16. Resilient supports at 22 connect between the platform 16 and the hopper 12 to at all times maintain the bottom wall 24 of the hopper above the floor surface 17. Vibration is imparted to the platform 16 and resultingly to the tower 10 through spaced motors 26, 28 carried on the platform 16.

More particularly, the tower 10 has a cylindrical casing 30 which encloses a spiral flight 32 defining a helical ramp surface 34 which, upon being vibrated in a combined rectilinear/torsional movement, conveys material thereon in a vertical direction. As previously noted, the precise configuration of the tower 10 is not critical to the operation of the invention. Different configuration of the spiral flight 32 can be utilized. FIG. 7 shows a ramp surface 34' different from surface 34. For example, the flight 32 might alternatively be wrapped around a central core so as to be exposed throughout its length. However, in terms of dust control and temperature maintenance for conveyed material, the described enclosed construction is preferred.

The casing 30 is fixedly attached to the bottom wall 24 of the hopper 12. As shown in FIG. 3, the casing 30 has at least one cutout 36 defining an opening 37 to establish communication between a material holding chamber 38 defined by the hopper 12 and the enclosed conveying path defined by the casing 30. A distribution member 40 is attached to the wall 24 and defines a cone-shaped surface adjacent the opening 37 to distribute incoming material radially for passage onto the flight 32. A vane 31 is affixed at one end 33 to the casing 30 adjacent to one edge of the cutout 36 with a free end portion of the vane projecting into the hopper 12 so that as the hopper and casing 30 are vibrated material in the hopper will be guided by the vane or vanes 31 through the opening 37 and against the distribution member 40 and subsequently up the helical ramp surface 34. The vane or vanes 31 may be preset in a fixed orientation relative to the opening 37 or may be remotely pivotable so as to be remotely adjustable as the types, sizes, weights and other physical variables of the material being conveyed changes. The conveyed material moves progressively up the ramp surface 34 and ultimately comes in contact with a discharge vane at the top of the spiral flight 34 so as to be discharged through a radially directed trough 42 in alignment with a discharge opening at the top of the tower 10 for passage to a point of use.

The hopper 12 has an upwardly directed cylindrical wall 50 defining a generally cup-shaped configuration. The upper rim 44 of the hopper is spanned by beams 46, 48 which reinforce the cylindrical side wall 50 of the hopper 12 and provide a solid base to unify the tower 10 and hopper 12. The beams are interconnected at their ends by arcuate plates 52, 54, and fixed at diametrically opposite locations to the hopper 12. As seen in FIG. 1, the beams 46, 48 open laterally oppositely and are U-shaped in cross section. The web 56, 58 of each beam 46, 48 respectively abuts the outer surface of the casing 30 and is secured thereto as by welding. A rectangular reinforcing plate 60 has an opening 62 to permit passage of the casing 30 and a downwardly facing surface 64 which is placed facially against the legs 66, 68 of the beams 46, 48 respectively. The tower 10 and hopper 12 are thus rigidly unified. Openings at 70, 72 into the top of the hopper facilitate introduction of the material into the hopper 12.

The platform 16, from which the tower/hopper assembly 10, 12 is carried, is supported from the surface 17 bearing the apparatus by four legs 18. Each leg 18 has a generally squared cross section with an enlarged bearing pad 74 at its lower end and at its upper end a resilient element 76. Firestone Company manufactures a suitable product for the resilient element 76, which it identifies as its "Marsh Mellow". The four legs 18 bear on the corners of the platform 16, which has a generally square configuration. The legs 18 are interconnected to each other by braces 78 and cooperatively afford a firm foundation for the tower/hopper assembly 10, 12.

To support the tower/hopper assembly 10, 12 from the platform 16, the resilient supports 22 are spaced equidistantly around the hopper 12 and each extends from the hopper 12 to separate mounts 80 on the underside 82 of the platform 16. In the embodiment shown, four supports 22 are shown. To impart the desired rectilinear/torsional movement to the hopper 12, the supports 22 are arranged so that the line of force between the platform 16 and hopper 12 is at an angle $\alpha$ to the vertical. Preferably, the angle $\alpha$ is on the order of slightly over 21°, as shown clearly in FIGS. 1 and 2.

The supports 22 may incorporate leaf springs 84, made of fiberglass or metal shown in FIG. 1 or may be coil springs 86 as shown in FIG. 8, or any other suitable resilient structure. Four square channel members 88, 90, 92, 94, to support the springs 84 or 86, extend radially outwardly from the casing 30 and are rigidly attached thereto at one end. The channels 88, 90, 92, 94 are located at a height to coincide with the webs 56, 58 of beams 46, 48 and channels 92, 94 are secured thereto on opposite sides of the casing 30. The radially outermost end of channel 92 is secured to an arcuate plate 96 attached to the hopper 12, while the corresponding end of channel 94 is secured to a like, arcuate plate 98 diametrically opposite the plate 96. The channel 88 extends between and is rigidly connected to the casing 30 and plate 52, while channel 90 is rigidly connected to the casing 30 and plate 54.

In the case of leaf springs 84, the springs 84 are attached as by bolts to the channels 88, 90, 92, 94 in parallel pairs so that facing spring surfaces 100 facially abut oppositely facing surfaces 102, 104 on each of the channels 88, 90, 92, 94. To attach the upper ends of the springs 84 to the platform 16, one short channel pieces 106, corresponding in cross section to the channels 88, 90, 92, 94, is fixed between the spaced legs 108, 110 of each mount 80. Each mount has an inverted U-shaped configuration with a web 112 secured to the underside 82 of the platform 16.

In the event that coil springs 86 are used (FIG. 8), the coil springs are appropriately mounted by conventional techniques between the channels 88, 90, 92, 94 and channel sections 106 on the platform, so as to operate in the same manner as the leaf springs 84. The nature of a coil spring is such that its orientation is angularly directed on the other side of vertical axis of the tube 30 from the angular direction of leaf spring 84 to produce the same force transmissions.

The motors 26, 28 are mounted on the upwardly facing surface 114 of the platform 16. Separate mounts 116, 118 (FIGS. 2 and 6) are provided on the platform 16, to support motors 26, 28 respectively in elevated relationship with the platform upper surface 114. The motors 26, 28 are arranged so that their rotational axes are parallel and substantially horizontally situated. Each shaft carries an eccentric weight (not shown) so that upon rotation of the shaft, vibration is imparted to the platform. The details of the vibration imparting motors 26, 28 are not shown in the drawings as such structures are well known as exemplified by U.S. Pat. Nos. 3,358,815; 4,168,774; and 4,495,826. Preferably, one weight is disposed at each end of the shaft, with the weights at each end located approximately at an angle of 150° to each other so that they operate out of phase. The weights on each motor 26, 28 are similarly set.

Another aspect of the invention is the provision of structure, shown schematically at 120 in FIG. 2, for varying the force output of the vibratory generators and in particular for varying the position of the eccentric weights relative to the axis of rotation and thus the vibrations. The weights can initially be set for substantially no unbalanced force so that upon start-up minimum or very small transient response is produced. As the variable force members are relocated to produce an unbalanced force on the shaft, vibration is generated. The non-mechanically connected shafts and eccentrics will be subject to the inertial synchronization phenomenon to obtain proper synchronization of the two drive shafts and associated eccentric weights. Accordingly, smaller size motors can be used than with a non-adjustable eccentric weight. A longer life for the motors and associated structure can thus be anticipated. A typical variable force apparatus is disclosed in my U.S. Pat. No. 4,495,826 issued Jan. 29, 1985.

As can be seen, the above described system is a two mass system with a force member mass consisting of the motors 26, 28 and platform 16 and a work member mass consisting of the tower 10 and rigidly connected hopper 14. With the described system, the node point for the resilient supports 22 is closer to the force mass than the work mass. The result is that small amplitude vibrations imparted through the force mass generate large amplitude vibrations for the work mass. This minimizes the vibrational force imparted to the support surface 17 for the apparatus and thus makes it suitable for above grade installations.

The system can also be operated as a Frahm dynamic vibration absorber where the work mass is virtually motionless during operation.

I claim:

1. A vibratory material conveying apparatus comprising:
    a vertically extending tower defining a material conveying path and having a material inlet and an outlet spaced vertically above the inlet;
    conveying means within said tower for conveying material in said path from the tower inlet to the outlet upon said conveying means being vibrated;
    a hopper in communication with the tower inlet;
    a platform;
    means for resiliently supporting the platform above a support surface for said apparatus; said resilient supporting means absorbing vertically directed forces between said platform and said surface;
    means for resiliently attaching the hopper and tower to said platform; said hopper and tower being suspended by said means for resiliently attaching from the platform and spaced above the support surface, and
    vibration generating means on said platform for imparting vibration to said conveying means.

2. The vibratory material conveying apparatus according to claim 1 wherein means rigidly attach the hopper to the tower.

3. The vibratory material conveying apparatus according to claim 2 wherein said platform has an opening, the tower extends through said opening without contacting said platform and the hopper is supported by the tower beneath the platform.

4. The vibratory material conveying apparatus according to claim 1 wherein the means for resiliently attaching the hopper and tower to the platform comprises a plurality of leaf springs.

5. The vibratory material conveying apparatus according to claim 1 wherein the means for resiliently attaching the hopper and tower to the platform comprises a plurality of coil springs.

6. The vibratory material conveying apparatus according to claim 1 wherein the conveying means within the tower comprises at least one spiral flight.

7. The vibratory material conveying apparatus according to claim 1 wherein the means on the platform for imparting vibrating comprises first and second motors with first and second parallel, horizontal, rotary shafts and eccentric means on each of the first and second shafts for producing vibration imparted to said platform upon the first and second shafts being rotated.

8. The vibratory material conveying apparatus according to claim 7 wherein said eccentric means comprises a weight and means are provided to vary the position of each weight relative to its respective shaft axis to thereby vary the vibrational force imparted to the conveying means.

9. The vibratory material conveying apparatus according to claim 7 wherein each of the first and second shafts has spaced ends and said eccentric means comprises a weight on each end of the shafts, said weights on the spaced ends of each shaft being out of phase with each other.

10. A vibratory material conveying apparatus comprising:
    spiral means to be vibrated for conveying material vertically;
    a platform;
    cushioning means resiliently supporting the platform above a support surface for said apparatus;
    means for resiliently attaching the spiral conveying means to the platform so that said spiral means is spaced above said support surface and suspended from said platform; and
    means for imparting vibration to said platform and thereby to said spiral means to effect vertical conveyance of material.

11. The vibratory material conveying apparatus according to claim 10 wherein said platform has an opening, the spiral conveying means extends through said opening without contacting said platform, and the means for resiliently attaching the spiral conveying means comprises means extending between the platform and a part of the spiral conveying means extending below the platform.

12. The vibratory material conveying apparatus according to claim 10 wherein said platform comprises a plate with oppositely facing flat surfaces, means mount the vibration imparting means to one of said flat platform surfaces and the means for resiliently attaching the spiral conveying means comprises means extending between the other of the flat platform surfaces and a part of the spiral conveying means extending below the platform.

13. The vibratory material conveying apparatus according to claim 10 wherein the means for imparting vibration comprises first and second motors with first and second parallel, horizontal, rotary shafts and eccentric means on each of the first and second shafts for producing vibration imparted to said platform upon the first and second shafts being rotated.

14. The vibratory material conveying apparatus according to claim 11 wherein said platform opening is sufficiently large to accept the spiral conveying means without interference therebetween as the spiral conveying means is vibrated.

15. The vibratory material conveying apparatus according to claim 13 wherein each of the first and second shafts has spaced ends and said eccentric means comprises a weight on each end of the shafts, said weights on the spaced ends of each shaft being out of phase with each other.

16. The vibratory material conveying apparatus according to claim 14 wherein the means for resiliently attaching the spiral conveying means comprises a plurality of leaf springs, each said leaf spring having a flat surface in a non-vertical orientation.

* * * * *

UNITED STATES PATENT AND TRADEMARK OFFICE
CERTIFICATE OF CORRECTION

PATENT NO. : 4,858,749

DATED : August 22, 1989

INVENTOR(S) : Albert Musschoot

It is certified that error appears in the above identified patent and that said Letters Patent is hereby corrected as shown below:

Column 5, (claim 1), line 32, after "said", insert --tower and-- line 38, before "surface", insert --support--;

Column 5, (claim 7), line 66, after "imparting", cancel

"vibrating" and substitute therefor

--vibration--.

Signed and Sealed this

Eighth Day of January, 1991

Attest:

HARRY F. MANBECK, JR.

*Attesting Officer*      *Commissioner of Patents and Trademarks*

UNITED STATES PATENT AND TRADEMARK OFFICE
CERTIFICATE OF CORRECTION

PATENT NO. : 4,858,749
DATED : August 22, 1989
INVENTOR(S) : Albert Musshoot

It is certified that error appears in the above-identified patent and that said Letters Patent is hereby corrected as shown below:

```
Column 1, line 41, after "structure" insert --being--;
         line 42, after "and" insert --with--, and after
                 "flight" insert --being--;
         line 44, after "member" insert --mass--; and
         line 45, after "member" insert --mass--.

Column 5, Claim 1, line 41, after "attaching" insert --said
                 hopper and tower--.
```

Signed and Sealed this

Fourteenth Day of July, 1992

Attest:

DOUGLAS B. COMER

Attesting Officer     Acting Commissioner of Patents and Trademarks